(12) United States Patent
Inoue et al.

(10) Patent No.: US 6,672,197 B2
(45) Date of Patent: Jan. 6, 2004

(54) AUTOMATIC BRAKE BOOSTER

(75) Inventors: Hidefumi Inoue, Saitama-Ken (JP); Naohito Saito, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 115 days.

(21) Appl. No.: 10/008,876

(22) Filed: Nov. 8, 2001

(65) Prior Publication Data

US 2002/0066362 A1 Jun. 6, 2002

(30) Foreign Application Priority Data

Dec. 5, 2000 (JP) ........................... 2000-370245

(51) Int. Cl.[7] ................................................. F15B 13/16
(52) U.S. Cl. ........................................ 91/367; 91/376 R
(58) Field of Search ................................. 91/367, 376 R

(56) References Cited

U.S. PATENT DOCUMENTS 5,857,399 A    1/1999  Tsubouchi et al.
6,250,200 B1 * 6/2001  Ikeda et al. .................. 91/367
6,345,565 B1 * 2/2002  Tsubouchi et al. ............ 91/367

* cited by examiner

*Primary Examiner*—Edward K. Look
*Assistant Examiner*—Michael Leslie
(74) *Attorney, Agent, or Firm*—Flynn, Thiel, Boutell & Tanis, P.C.

(57) ABSTRACT

An automatic brake booster includes a solenoid and a solenoid plunger which allow a flow path in a valve mechanism to be switched without depression of a brake pedal. The solenoid plunger comprises a rear member on which an atmosphere valve seat is formed, a front member which is disposed to be displaceable with respect to the rear member, and a first spring disposed between the both members. When a current fed to the solenoid is less than a given value, the first spring remains inactive while when the current exceeds the given value, the first spring becomes flexed to reduce a clearance between the rear member and a holder which forms part of a magnetic path of the solenoid together with the rear member. When the booster operates as an automatic brake, a gentle brake operation which allows a precise control with a reduced brake output and a quick brake operation with an increased brake output can be simultaneously achieved in a preferred manner.

3 Claims, 3 Drawing Sheets

AUTOMATIC BRAKE BOOSTER

FIELD OF THE INVENTION

The present invention relates to an automatic brake booster which is used in a brake of an automobile or the like, and more particularly, to an improvement of the valve mechanism thereof.

DESCRIPTION OF THE PRIOR ART

An automatic brake booster comprising a valve body slidably disposed within a shell, a power piston mounted on the valve body to divide the interior of the shell into a constant pressure chamber and a variable pressure chamber, a valve mechanism mounted on the valve body for controlling a switching of a flow path which supplies a fluid to or discharges it from the variable pressure chamber, an input shaft for operating the valve mechanism, a solenoid mounted on the valve body for operating the valve mechanism, an output shaft for externally transmitting an output from the power piston, and a reaction disc which transmits a reaction from the output shaft to the valve mechanism is known in the art. The valve mechanism comprises a vacuum valve seat formed on the valve body, a solenoid plunger slidably disposed in the valve body, an atmosphere valve seat formed on the solenoid plunger, a valve element which can be seated on the vacuum valve seat and the atmosphere valve seat, and a valve plunger slidably mounted on the valve body and coupled to the input shaft for displacing the solenoid plunger forwardly as the input shaft is driven forward to operate the valve mechanism. The solenoid plunger is mounted on the valve body to form part of a magnetic path with a holder which is located forwardly thereof to be displaced forwardly to operate the valve mechanism as the solenoid is energized.

However, when the booster is to operate as an automatic brake, as the solenoid is energized, an output from the booster is determined in accordance with the force with which the solenoid plunger is excited. Specifically, an increased output can be obtained by using a solenoid having a greater magnitude of excitation, but there occurs a large change in the output from the booster relative to a change in the current which is used to excite the solenoid, preventing a precise control over the magnitude of the output from being achieved by controlling the current. On the other hand, when a solenoid having a reduced force of excitation is used, an output from the booster has a small change as the exciting current is changed, and although this allows a precise control, it prevents an increased output from the booster from being achieved.

Accordingly, it will be seen that the described automatic brake booster suffers from its inability to satisfy both a brake control which requires a precise control even though an increased output is not required as when decelerating from a low vehicle speed or bringing a vehicle to a stop and a brake control which requires an increased output even though a precise control is not required as when bringing a vehicle to a stop from a high vehicle speed or during an emergency stop.

SUMMARY OF THE INVENTION

In view of the foregoing, in an automatic brake booster including a valve body slidably disposed in a shell, a power piston mounted on the valve body and partitioning the interior of the shell into a constant pressure chamber and a variable pressure chamber, a valve mechanism for switchably controlling a flow path through which a fluid is supplied to or discharged from the variable pressure chamber, an input shaft for switchably operating the valve mechanism, a solenoid mounted on the valve body for switchably operating the valve mechanism, an output shaft for externally transmitting an output from the power piston, and a reaction disc for transmitting a reaction from the output shaft to the valve mechanism, the valve mechanism comprising a vacuum valve seat formed on the valve body, a solenoid plunger slidably disposed in the valve body, an atmosphere valve seat formed on the solenoid plunger, a valve element which can be seated on the vacuum valve seat and the atmosphere valve seat, and a valve plunger slidably mounted on the valve body and coupled to the input shaft to cause the solenoid plunger to be displaced forwardly as the input shaft is driven forward to operate the valve mechanism, the solenoid having a magnetic path which is defined in part by the solenoid plunger and a holder which is mounted on the valve body and located forwardly of the solenoid plunger so that when the solenoid is energized, the solenoid plunger is displaced forwardly to operate the valve mechanism, in accordance with the present invention, the solenoid plunger comprises a rear member on which the atmosphere valve seat is formed and which is disposed in opposing relationship with the holder through a clearance and adapted to be displaced forwardly by the solenoid, a front member disposed to be movable relative to the rear member so as to be capable of abutment against the reaction disc, and a first resilient member disposed between the front member and the rear member to maintain them spaced apart, the arrangement being such that when the current which is used to energize the solenoid is below a given value, the first resilient member remains as set to maintain the given clearance between the rear member and the holder while when the current supplied to the solenoid increases above the given value, the first resilient member flexes to reduce the clearance between the rear member and the holder by an amount corresponding to the flexure thereof as compared with the given clearance.

With the arrangement of the present invention, when the current which energizes the solenoid is equal to or less than the given value, the given clearance is maintained between the rear member and the holder of the solenoid plunger to allow an output from the booster to rise with a given slope with respect to the current supplied to the solenoid while when the current supplied to the solenoid exceeds the given value, the clearance between the rear member and the holder can be reduced to be less than the given clearance, thus allowing an output from the booster to rise at a greater slope with respect to the current supplied to the solenoid.

Specifically, when the current is equal to or less than the given value, the booster provides a reduced output, but a precise control is enabled. By contrast, when the current exceeds the given value, an output from the booster can be increased. In this manner, a brake control which requires a precise control as when decelerating from a low vehicle speed or bringing a vehicle to a stop as well as a brake control which requires an increased output when decelerating from a high vehicle speed or during an emergency stop can be both preferably achieved even though this has been difficult with the conventional automatic brake booster.

Above and other objects, features and advantages of the present invention will become apparent from the following description of an embodiment thereof with reference to the attached drawings.

DETAILED DESCRIPTION OF THE EMBODIMENT

Figure 1:
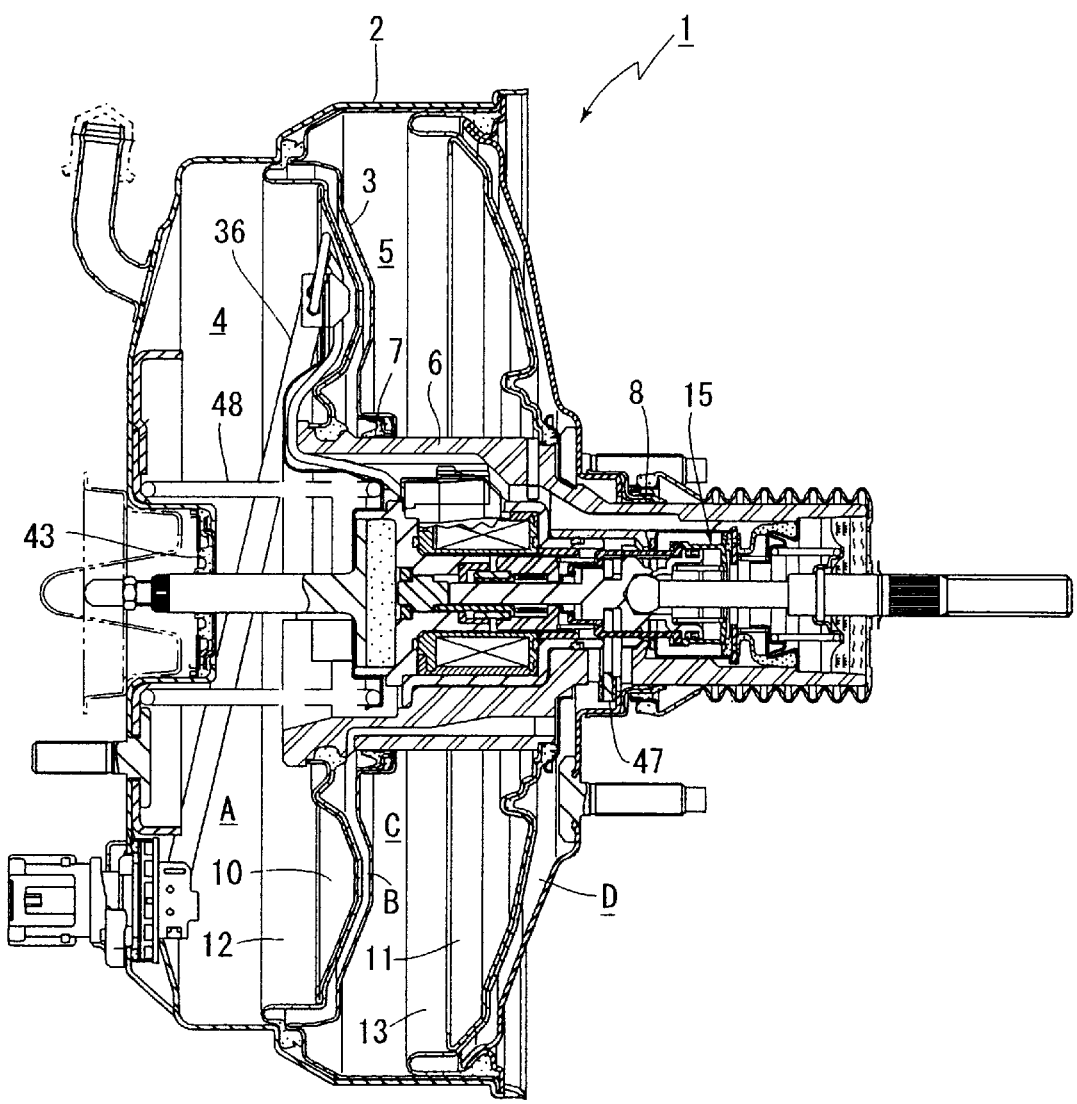
FIG. 1 is a cross section of one embodiment of the invention.

Referring to the drawing, an embodiment of the present invention will be described. Referring to FIG. 1, a tandem brake booster 1 includes a shell 1, the interior of which is partitioned by a center plate 3 into a front chamber 4 and a rear chamber 5, which are located thereacross. A tubular valve body 6 slidably extends through the rear end of the shell and the center plate 3, with seal means 7 and 8 interposed therebetween, maintaining a hermetic seal thereat.

A front power piston 10 and a rear power piston 11 are connected to the outer periphery of the valve body 6 at locations which are situated within the front chamber 4 and the rear chamber 5, respectively. A front diaphragm 12 and a rear diaphragm 13 are applied to the back surfaces of the respective pistons 10 and 11. In this manner, a constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

A valve mechanism 15 which switches a communication between the constant pressure chambers A and C and the variable pressure chambers B and D is mounted in the valve body 6.

Figure 2:
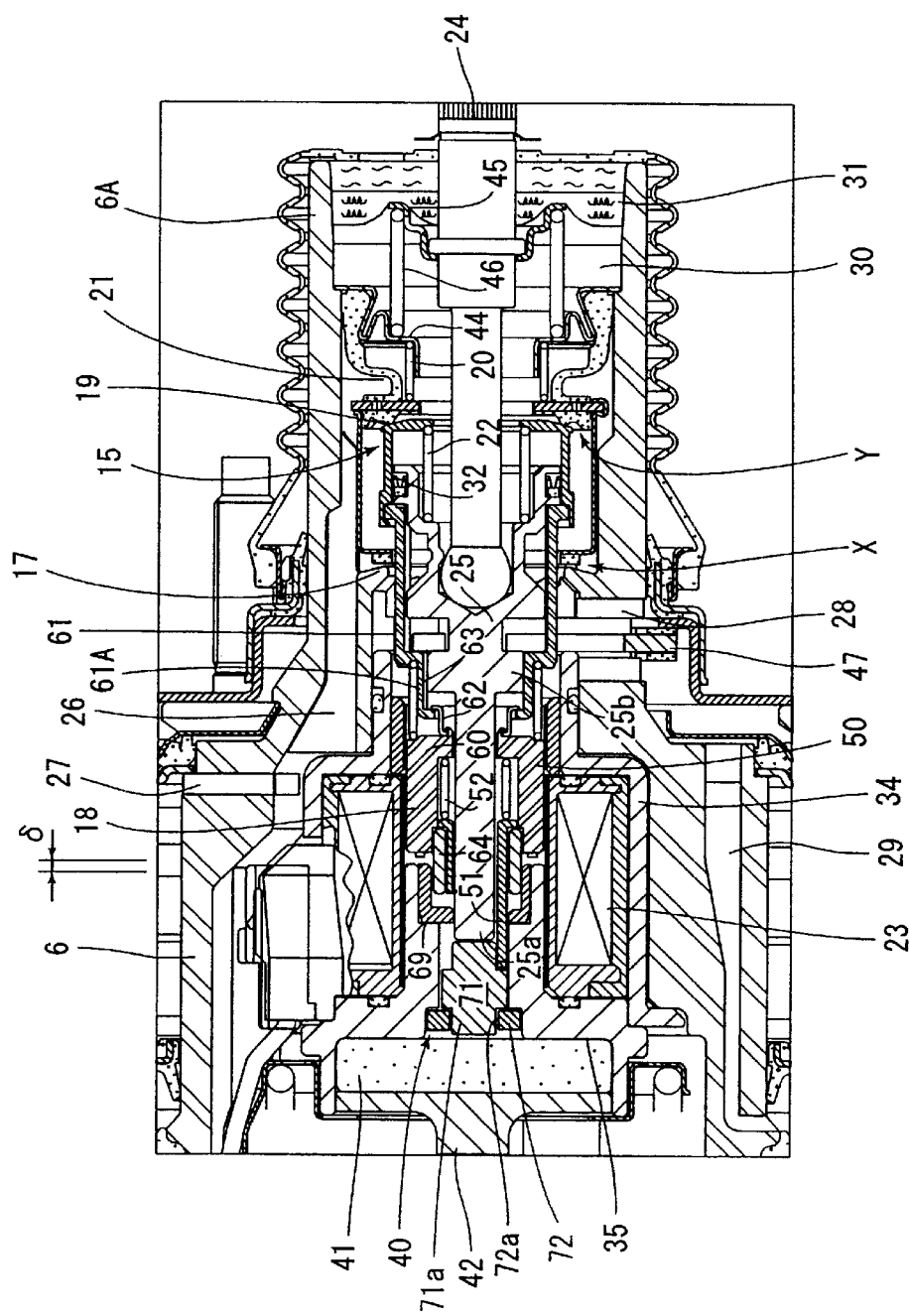
FIG. 2 is an enlarged view of part shown in FIG. 1.

As shown in FIG. 2, the valve mechanism 15 comprises an annular vacuum valve seat 17 extending rearward from the inner periphery of the valve body 6, a solenoid plunger 18 slidably fitted into the valve body 6, an atmosphere valve seat 19 formed on the solenoid plunger 18 and facing rearward, a valve element 21 which is urged forwardly by a poppet return spring 20 in a forward direction and having a first seat area adapted to be seated on the vacuum valve seat 17 and a second seat area adapted to be seated on the atmosphere valve seat 19, a spring 22 for urging the solenoid plunger 18 rearward to maintain the atmosphere valve seat 19 at an advanced position relative to the vacuum valve seat 17, a solenoid 23 for displacing the solenoid plunger 18 forwardly against the resilience of the spring 22, and a valve plunger 25 disposed to be displaceable relative to the valve body 6 and the solenoid plunger 18 and coupled to an input shaft 24.

The valve mechanism 15 also comprises an axial constant pressure passage 26 formed within the valve body 6 and communicating a space located radially outward of a vacuum valve X, which is formed by the vacuum valve seat 17 and the first seat area of the valve element 21 which is seated thereon, with the constant pressure chamber A, a radial constant pressure passage 27 which communicates the constant pressure passage 26 with the constant pressure chamber C, a radial constant pressure passage 28 which communicates a space between the vacuum valve X and an atmosphere valve Y, formed by the atmosphere valve seat 19 and the second seat area of the valve element 21 which is seated thereon, with the variable pressure chamber B, an axial variable pressure passage 29 which provides a communication between the variable pressure chambers B and D, and an atmosphere passage 30 which is formed in a tubular end region 6A for communicating a space located radially inward of the atmosphere valve Y with the atmosphere. A filter 31 is disposed in the atmosphere passage 30. The constant pressure chamber A communicates with an intake manifold of an engine, through a negative pressure introducing tube, not shown, which is mounted on the shell 2, whereby a negative pressure is normally introduced into the constant pressure chambers A and C.

An annular seal ring 32 is disposed around the outer periphery of the valve plunger 25 on which the solenoid plunger 18 is fitted to maintain a hermetic seal between the inner peripheral surface of the solenoid plunger 18 and the outer peripheral surface of the valve plunger 25. The solenoid 23 is held between a yoke 34 which is fitted into the valve body 6 and the holder 35, and is connected to an external controller, not shown, through a wiring 36 (see FIG. 1) which is disposed along the inner wall of the shell 2. When the solenoid 23 is energized, the holder 35 is also magnetically excited.

The right end of the valve plunger 25 is connected to the left end of the input shaft 24, the right end of which is connected to a brake pedal, not shown. A reaction plunger 40 and a reaction disc 41, which are fitted into the holder 35, are sequentially disposed to the left of the valve plunger 25. One end of an output shaft 42 is disposed in abutment against the left end face of the reaction disc 41 and the output shaft 42 has a base end which is received within the holder 35. The other end of the output shaft projects externally through an axial portion of the shell 2 through a seal member 43 (see FIG. 1).

A valve return spring 46 is disposed between a retainer 44 which is fixed in the tubular end region 6A of the valve body 6 and the input shaft 24 to urge the input shaft 24 and its connected valve plunger 25, solenoid plunger 18 and valve element 21 rearward.

The valve plunger 25 is prevented from being withdrawn from the valve body 6 by means of a key member 47 which is well known in the art. When the booster is inoperative, the key member 47 is disposed in abutment against the rear inner surface of the shell 2, thus maintaining the valve plunger 25 at its advanced position relative to the valve body 6.

A return spring 48 is disposed between the front inner wall of the shell 2 and the valve body 6 for normally maintaining the valve body 6 at its inoperative position shown (see FIG. 1).

In the present embodiment, the solenoid plunger 18 comprises a rear member 50 on which the atmosphere valve seat 19 is formed, a front member 51 fitted into the rear member 50 so as to be displaceable relative thereto and disposed in abutment against the reaction plunger 40 for transmitting a brake reaction, and a first spring or resilient member 52 which is disposed between the rear member 50 and the front member 51 to maintain them spaced apart.

The rear member 50 comprises a drive member 60 formed of a magnetizable material and through which a reduced diameter portion 25a of the valve plunger 25 extends, a valve member 61 formed of a non-magnetizable material which is fitted around a body 25b of the valve plunger 25 and having a rear end which projects rearwardly beyond the vacuum valve seat 17, an engaging portion 62 having a front end which is disposed as a press fit into the drive member 60 from the rear side and having a terminal end which is folded radially outward to engage an engaging portion 61A of the valve member 61 which is folded radially inward, a second spring or resilient member 63 disposed between the drive member 60 and the valve member 61 and passing through the engaging portion 62, and an abutment 64 which is fitted into the drive member 60 from the front side to engage the front member 61 which is fitted into the drive member 60 in a displaceable manner to prevent the front member 51 from being withdrawn. In the inoperative condition shown in FIG. 2, the second spring 63 maintains the drive member 60 and the valve member 61 spaced apart, whereby the valve member 61 engages the terminal end of the engaging portion 62.

As a result of constructing the solenoid plunger 18 in the manner mentioned above, when the booster is to operate as an automatic brake in which the solenoid 23 is energized to cause a stroking of the solenoid plunger 18, an arrangement is achieved which allows the force with which the drive member 60 is excited to be changed with respect to the current which is fed to the solenoid 23, by changing the clearance δ between the drive member 60 which is formed of a magnetizable material and the holder 35 beyond a given value. The drive member 60 and the holder 35 form together part of a magnetic path.

The front member 51 and the valve plunger 25, which extend forwardly through a notch in a collar 69 which is fitted over the drive member 60 from the front side and forming a part of the holder 35, are disposed in abutment against a first member 71, which is located forwardly thereof and forming part of the reaction plunger 40 which is disposed in opposing relationship thereto.

The reaction plunger 40 comprises the first member 71 in the form of a solid cylinder which is slidably fitted into a reduced diameter portion of the holder 35 which forms part of the valve body 6, and a ring-shaped second member 72 which is slidably fitted into an intermediate diameter portion of the holder 35. The second member 72 is centrally formed with an opening 72a, through which a reduced diameter portion 71a which is centrally formed on the first member 71 projects forwardly, permitting the reduced diameter portion 71a and the second member 72 which are concentrically disposed to abut against the rear end face of the reaction disc 41. When the booster is inoperative, the second member 72 is engaged with a step on the first member 71 to be spaced from the holder 35, whereby a given clearance is formed with respect to the holder 35.

When the reaction plunger 40 is constructed in the manner mentioned above, an output from the booster when it is operating as an automatic brake can be controlled in a more preferred manner without detracting from maneuverability during a normal brake operation, as will be described later.

As described, in the present embodiment, the first spring 52 disposed forwardly of the drive member 60 which is formed of a magnetizable material and thus disposed between it and the front member 61 which is formed of a non-magnetizable material maintains the both members 51 and 60 spaced apart, while the second spring 63 which is disposed rearward of the drive member 60 and thus between it and the valve member 61 which is formed of a non-magnetizable material maintains the both members 60 and 61 spaced apart. Accordingly, during a normal brake operation in which a brake pedal is depressed and the input shaft 24, the valve plunger 25 and the solenoid plunger 18 which abuts against the valve plunger 25 are driven forward, the valve element 21 is also driven forward as the input shaft 24, the valve plunger 25 and the solenoid plunger 18 are driven forward, and the first seat area on the valve element 21 becomes seated on the vacuum valve seat 17 to close the vacuum valve X while the atmosphere valve seat 19 on the solenoid plunger 18 becomes removed from the second seat on the valve element 21 to open the atmosphere valve Y. As a consequence, the atmosphere is introduced into the variable pressure chambers B and D to drive the power pistons 10 and 11 forward. A resulting brake reaction from the reaction disc 41 is transmitted through the first member 71 and the second member 72 to the valve plunger 25, whereby the valve mechanism 15 is controlled so that a pedal input applied to the input shaft 24 is balanced with the brake reaction from the reaction disc 41. The brake reaction which is acting on the reaction disc 41 at this time is transmitted to the input shaft 24 through the valve plunger 25 in its entirety which is acting on the both members 71 and 72 as long as the second member 72 is engaged with the first member 71. However, when the second member 72 engages the valve body 6 and becomes removed from the first member 71, the brake reaction which is acting on the first member 71 alone is transmitted to the input shaft 24 through the valve plunger 25.

In this manner, when the second member 72 is removed from the first member 71, the proportion of the brake reaction which is transmitted to a driver is reduced by an amount corresponding to the second member 72, and thus an increased output, as compared with the prior art, can be obtained in a facilitated manner without detracting from the controllability for a reduced brake output.

By contrast, when a current of a magnitude less than a given value is fed to energize the solenoid 23 under the inoperative condition shown in FIG. 2 to provide a reduced output, the first spring 52 which is disposed forwardly of the drive member 60 which is formed of a magnetizable material and thus disposed between it and the front member 51 which is formed of a non-magnetizable material maintain the both members 51 and 60 spaced apart to cause them to be driven forward in an integral manner while the second spring 63 disposed rearward of the drive member and thus disposed between it and the valve member 61 which is formed of an non-magnetizable material maintains the both members 60 and 61 spaced apart to cause them to be driven forward in an integral manner. Thus, the both members 60 and 61 are driven forward in an integral manner while maintaining the conditions mentioned above until the reaction plunger 40 which is driven forward by the front member 51 abuts against the reaction disc 41, whereupon the advancing movement is continued maintaining the illustrated condition until the brake reaction is balanced with a thrust resulting from the excitation.

Figure 3:
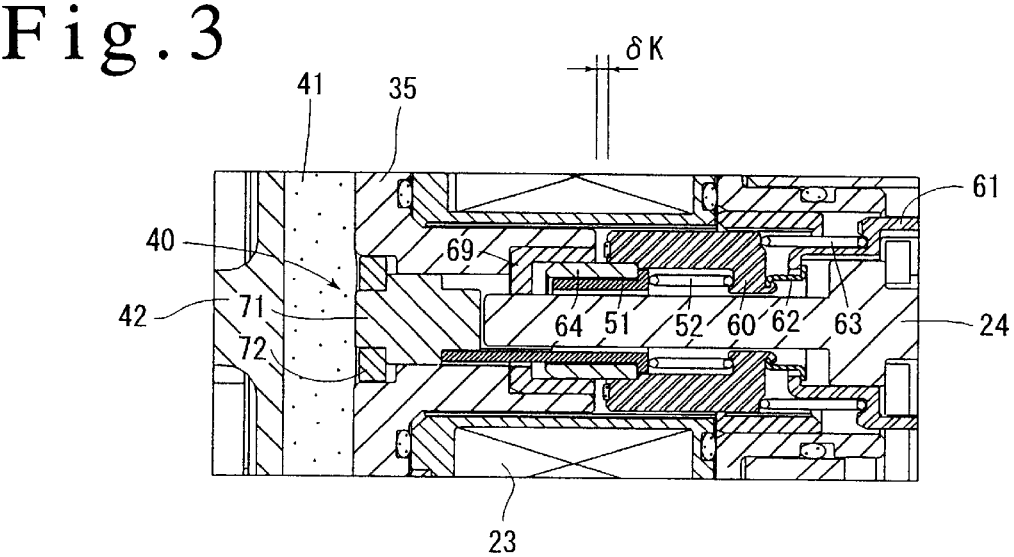
FIG. 3 is a schematic illustration of a phase of operation of the part shown in FIG. 2.
Figure 4:
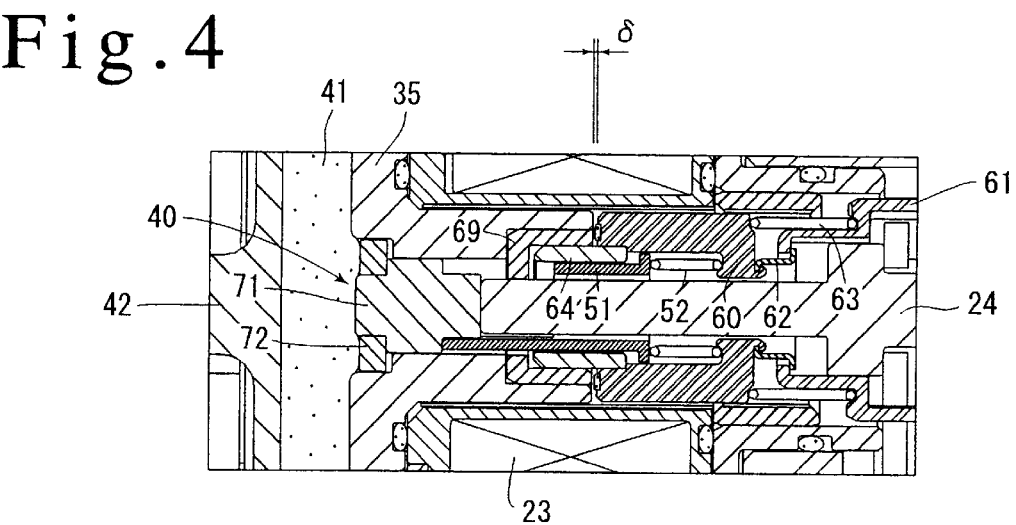
FIG. 4 is a schematic illustration of another phase of operation of the part shown in FIG. 2.

As a consequence, when the current fed to the solenoid 23 is less than a given value, a control is exercised so that the excitation of the drive member 60 by such current is balanced with the brake reaction from the reaction disc 41. However, because the excitation is less than the magnitude to which the first spring 52 is charged, the first spring 52 remains charged as shown in FIG. 3.

Figure 5:
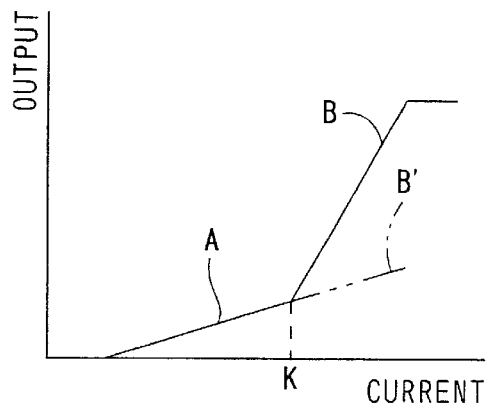
FIG. 5 graphically shows an output response of an automatic brake.

Accordingly, when the front member 51 abuts against the first member 71, the clearance δ between the drive member 60 and the holder 35, both formed of magnetizable materials, will be reduced from a maximum clearance shown in FIG. 2, but is maintained to be equal to or above a given clearance δK, whereby a change in the excitation with respect to a change in the current being fed will be reduced (see a solid line curve A in FIG. 5). When the given clearance δ is chosen large, the excitation of the drive member 60 which results from the current fed to the solenoid 23 will be reduced, and accordingly, a suitable choice of the given clearance δK allows a precise control with a reduced output which is adequate to a gentle brake operation.

However, when the current fed to the solenoid 23 increases above a given value K, the resulting excitation of the drive member 60 exceeds the load to which the first spring 52 is charged, causing the latter to be flexed, thus allowing the drive member 60 to be driven forward relative to the front member 51 by an amount corresponding to the flexure of the first spring 52. As a result, the clearance δ between the drive member 60 and the holder 35 is reduced below the given clearance δK. The resulting excitation of the drive member 60 will be greater with respect to the current fed to the solenoid 23, producing a greater change in the excitation with respect to a change in the current (see a solid line curve B in FIG. 5). Thus, as compared with a magnitude of the current which is less than a given value, an increased output can be obtained.

As mentioned above, when the current fed to the solenoid 23 is greater than the given value, the first spring 52 will be flexed under the condition in which it is charged, and the drive member 60 is driven forward by a corresponding amount relative to the front member 51, and this causes the atmosphere valve seat 19 on the valve member 61 to be driven forward. Accordingly, a greater excitation of the drive member 60 produces a greater opening of the atmosphere valve Y. Consequently, the atmosphere is rapidly introduced into the variable pressure chambers B and D, allowing an increased output to be obtained quickly. When the output exceeds the excitation, the drive member 60 is pushed back rearward to close the atmosphere valve Y, which in turn reduces the excitation of the drive member 60, and the output will be settled as shown at B.

It will be understood from the foregoing description that the automatic brake booster 1 according to the present embodiment allows an automatic brake operation to be achieved in a preferred manner which enables both a gentle brake operation which enables a precise control with a reduced brake output and a quick brake operation which requires an increased brake output simultaneously.

While the invention has been described above in connection with a preferred embodiment thereof, it should be obvious that a number of changes, modifications and substitutions therein are possible from above disclosure without departing from the scope and spirit of the invention defined by the attached claims.

What is claimed is:

1. An automatic brake booster including a valve body slidably disposed in a shell, a power piston mounted on the valve body for partitioning the interior of the shell into a constant pressure chamber and a variable pressure chamber, a valve mechanism mounted on the valve body for switchably controlling a flow path through which a fluid is supplied to or discharged from the variable pressure chamber, an input shaft for switchably operating the valve mechanism, a solenoid mounted on the valve body for switchably operating the valve mechanism, an output shaft for externally transmitting an output from the power piston, and a reaction disc for transmitting a reaction from the output shaft to the valve mechanism; the valve mechanism comprising a vacuum valve seat formed on the valve body, a solenoid plunger slidably mounted in the valve body, an atmosphere valve seat formed on the solenoid plunger, a valve element which can be seated on the vacuum valve seat and the atmosphere valve seat, and a valve plunger slidably mounted on the valve body and coupled to the input shaft for displacing the solenoid plunger forwardly as the input shaft is driven forward to operate the valve mechanism, the solenoid having a magnetic path which is defined in part by the solenoid plunger and a holder mounted on the valve body and located forwardly of the solenoid plunger, the solenoid plunger being displaced forwardly as the solenoid is energized to operate the valve mechanism;

characterized in that the solenoid plunger comprises a rear member on which the atmosphere valve seat is formed and disposed in opposing relationship with the holder with a clearance therebetween and adapted to be displaced forwardly by the solenoid, a front member disposed to be displaceable with respect to the rear member and capable of abutting against the reaction disc, and a first resilient member disposed between the front member and the rear member for maintaining both members spaced apart, the arrangement being such that when a current fed to the solenoid is less than a given value, the first resilient member remains as charged to maintain a given clearance between the rear member and the holder so as to reduce the output change of the booster with respect to the supply current to the solenoid and when the current fed to the solenoid increases above the given value, the first resilient member becomes flexed to permit the clearance between the rear member and the holder to be reduced by a given amount corresponding to the flexure as compared with the given clearance so as to increase the output change of the booster with respect to the supply current to the solenoid.

2. An automatic brake booster including a valve body slidably disposed in a shell, a power piston mounted on the valve body for partitioning the interior of the shell into a constant pressure chamber and a variable pressure chamber, a valve mechanism mounted on the valve body for switchably controlling a flow path through which a fluid is supplied to or discharged from the variable pressure chamber, an input shaft for switchably operating the valve mechanism, a solenoid mounted on the valve body for switchably operating the valve mechanism, an output shaft for externally transmitting an output from the power piston, and a reaction disc for transmitting a reaction from the output shaft to the valve mechanism; the valve mechanism comprising a vacuum valve seat formed on the valve body, a solenoid plunger slidably mounted in the valve body, an atmosphere valve seat formed on the solenoid plunger, a valve element which can be seated on the vacuum valve seat and the atmosphere valve seat, and a valve plunger slidably mounted on the valve body and coupled to the input shaft for displacing the solenoid plunger forwardly as the input shaft is driven forward to operate the valve mechanism, the solenoid having a magnetic path which is defined in part by the solenoid plunger and a holder mounted on the valve body and located forwardly of the solenoid plunger, the solenoid plunger being displaced forwardly as the solenoid is energized to operate the valve mechanism;

characterized in that the solenoid plunger comprises a rear member on which the atmosphere valve seat is formed and disposed in opposing relationship with the holder with a clearance therebetween and adapted to be displaced forwardly by the solenoid, the rear member comprises a drive member which is adapted to be displaced forwardly by the solenoid, a valve member on which the atmosphere valve seat is formed and disposed to be displaceable with respect to the drive member and adapted to be displaced forwardly by the valve plunger, and a second resilient member disposed between the drive member and the valve member for maintaining the both members spaced apart, the second resilient member being constructed such that as long as it is urged to a magnitude less than the magnitude to which it is charged from the valve member during a normal operation, it maintains a given spacing between the drive member and the valve member to displace both members forwardly in an integral manner to cause the atmosphere valve seat to be removed from the valve element while when it is urged to a greater magnitude to which it is charged from the valve member, it permits the valve member to be displaced forwardly relative to the front member to cause the atmosphere valve seat to be removed to a further degree from the valve element; and a front member disposed to be displaceable with respect to the rear member and capable of abutting against the reaction disc, and a first resilient member disposed between the front member and the rear member for maintaining the both members spaced apart, the arrangement being such that when a current fed to the solenoid is less than a given value, the first resilient member remains as charged to maintain a given clearance between the rear member and the holder while when the current fed to the solenoid increases above the given value, the first resilient member becomes flexed to permit the clearance between the rear member and the holder to be reduced by a given amount corresponding to the flexure as compared with the given clearance.

3. An automatic brake booster including a valve body slidably disposed in a shell, a power piston mounted on the valve body for partitioning the interior of the shell into a constant pressure chamber and a variable pressure chamber, a valve mechanism mounted on the valve body for switchably controlling a flow path through which a fluid is supplied to or discharged from the variable pressure chamber, an input shaft for switchably operating the valve mechanism, a solenoid mounted on the valve body for switchably operating the valve mechanism, an output shaft for externally transmitting an output from the power piston, and a reaction disc for transmitting a reaction from the output shaft to the valve mechanism; the valve mechanism comprising a vacuum valve seat formed on the valve body, a solenoid plunger slidably mounted in the valve body, an atmosphere valve seat formed on the solenoid plunger, a valve element which can be seated on the vacuum valve seat and the atmosphere valve seat, and a valve plunger slidably mounted on the valve body and coupled to the input shaft for displacing the solenoid plunger forwardly as the input shaft is driven forward to operate the valve mechanism, the solenoid having a magnetic path which is defined in part by the solenoid plunger and a holder mounted on the valve body and located forwardly of the solenoid plunger, the solenoid plunger being displaced forwardly as the solenoid is energized to operate the valve mechanism;

characterized in that the solenoid plunger comprises a rear member on which the atmosphere valve seat is formed and disposed in opposing relationship with the holder with a clearance therebetween and adapted to be displayed forwardly by the solenoid, a front member disposed to be displaceable with respect to the rear member and capable of abutting against the reaction disc, and a first resilient member disposed between the front member and the rear member for maintaining both members spaced apart, the arrangement being such that when a current fed to the solenoid is less than a given value, the first resilient member remains as charged to maintain a given clearance between the rear member and the holder while when the current fed to the solenoid increases above the given value, the first resilient member becomes flexed to permit the clearance between the rear member and the holder to be reduced by a given amount corresponding to the flexure as compared with the given clearance; and a reaction plunger disposed forwardly of the front member and the valve plunger, the reaction plunger comprising a first member disposed for abutment against the front member and the valve plunger, and a second member disposed to be displaceable relative to the first member, the arrangement being such that the first member engages the second member at the commencement of a brake operation to transmit a brake reaction acting on the first member and a brake reaction acting on the second member to the front member or the valve plunger while after the second member engages the valve body to be removed from the first member, only a brake reaction acting on the first member is transmitted to the front member or the valve plunger.

* * * * *